(12) United States Patent
Sugio

(10) Patent No.: US 9,568,352 B2
(45) Date of Patent: Feb. 14, 2017

(54) OIL SEPARATOR

(71) Applicant: NABTESCO AUTOMOTIVE CORPORATION, Tokyo (JP)

(72) Inventor: Takuya Sugio, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 0 days.

(21) Appl. No.: 14/769,678

(22) PCT Filed: Feb. 26, 2014

(86) PCT No.: PCT/JP2014/054744
§ 371 (c)(1),
(2) Date: Aug. 21, 2015

(87) PCT Pub. No.: WO2014/133034
PCT Pub. Date: Sep. 4, 2014

(65) Prior Publication Data
US 2016/0011037 A1 Jan. 14, 2016

(30) Foreign Application Priority Data
Feb. 26, 2013 (JP) .................................. 2013-036392

(51) Int. Cl.
*G01F 23/62* (2006.01)
*B60R 17/00* (2006.01)
(Continued)

(52) U.S. Cl.
CPC ............... *G01F 23/62* (2013.01); *B01D 45/08* (2013.01); *B60T 17/004* (2013.01); *F04B 39/04* (2013.01); *F04B 39/16* (2013.01)

(58) Field of Classification Search
CPC ........ G01F 23/62; B01D 45/08; B60T 17/004; F04B 39/16; F04B 39/04
See application file for complete search history.

(56) References Cited

U.S. PATENT DOCUMENTS 1,612,017 A * 12/1926 Hastings ................. E03B 5/025
137/211
1,827,525 A * 10/1931 Huggins ............... G01F 23/303
338/12
(Continued)

FOREIGN PATENT DOCUMENTS

JP H09-033322 A 2/1997
JP H10-296038 A 11/1998
(Continued)

OTHER PUBLICATIONS

International Search Report as issued in International Patent Application No. PCT/JP2014/054744, dated May 27, 2014.
(Continued)

*Primary Examiner* — Amber R Orlando
*Assistant Examiner* — Brittanny Precht
(74) *Attorney, Agent, or Firm* — Pillsbury Winthrop Shaw Pittman LLP

(57) ABSTRACT

An oil separator introduces purge air from an air dryer into a housing, separates oil from the purge air, and recovers collected liquid containing the oil. The oil separator is equipped with a detecting member. The detecting member detects the amount of the collected liquid in the housing and outputs the result of the detection to a reporting member.

9 Claims, 5 Drawing Sheets

(51) Int. Cl.
*B01D 45/08* (2006.01)
*F04B 39/16* (2006.01)
*F04B 39/04* (2006.01)
*B60T 17/00* (2006.01)

(56) References Cited

U.S. PATENT DOCUMENTS

| | | | | | |
|---|---|---|---|---|---|
| 2,134,104 | A | * | 10/1938 | Cressy | G01F 23/38 324/157 |
| 2,370,099 | A | * | 2/1945 | Werder | G01F 23/36 73/313 |
| 2,489,370 | A | * | 11/1949 | Fowler | B01D 19/0021 55/428 |
| 2,515,202 | A | * | 7/1950 | Dyer | B01D 45/08 73/200 |
| 2,521,472 | A | * | 9/1950 | McMahon | B01F 3/04808 200/560 |
| 2,524,261 | A | * | 10/1950 | Kaminky | A47J 31/56 200/183 |
| 2,630,011 | A | * | 3/1953 | Butts | G01F 23/66 73/316 |
| 2,689,623 | A | * | 9/1954 | Schebler | B01D 45/08 55/342 |
| RE24,075 | E | * | 10/1955 | De Giers | G01N 9/16 73/304 C |
| 3,199,526 | A | * | 8/1965 | Pall | B01D 45/08 137/192 |
| 5,246,309 | A | * | 9/1993 | Hobby | B01D 53/84 210/615 |
| 5,720,394 | A | * | 2/1998 | Nishiyama | B03B 5/60 209/172 |
| 6,226,888 | B1 | * | 5/2001 | Lang | B01D 53/261 34/332 |
| 6,319,296 | B1 | * | 11/2001 | Fornof | B01D 46/0012 55/313 |
| 2003/0065423 | A1 | * | 4/2003 | Vanderbeek | G05D 16/2073 700/275 |
| 2005/0092180 | A1 | * | 5/2005 | Fornof | B60T 17/004 95/278 |
| 2006/0196356 | A1 | * | 9/2006 | Henderson | B01D 53/08 95/107 |
| 2006/0196361 | A1 | * | 9/2006 | Henderson | B01D 53/261 96/148 |
| 2007/0028777 | A1 | * | 2/2007 | Hoffman | B60T 17/004 96/143 |
| 2008/0192894 | A1 | * | 8/2008 | O'Brien | A61G 10/023 378/65 |
| 2008/0307965 | A1 | * | 12/2008 | Hoffman | B01D 45/16 95/119 |
| 2009/0220359 | A1 | * | 9/2009 | Koeck | B60T 17/02 417/321 |
| 2012/0090340 | A1 | * | 4/2012 | Okamoto | F25B 29/00 62/238.2 |
| 2013/0058799 | A1 | * | 3/2013 | Scarpinato | F04B 49/06 417/53 |
| 2013/0145734 | A1 | * | 6/2013 | Cho | B60T 17/04 55/315.1 |
| 2013/0175003 | A1 | * | 7/2013 | Bergh | B01D 53/265 165/61 |

FOREIGN PATENT DOCUMENTS

| | | |
|---|---|---|
| JP | 2002-239333 A | 8/2002 |
| JP | 2006-097843 A | 4/2006 |
| JP | 2006-152945 A | 6/2006 |
| JP | 2007-268340 A | 10/2007 |
| JP | 2007-327439 A | 12/2007 |
| JP | 2013-032089 A | 2/2013 |
| JP | 2013-032733 A | 2/2013 |
| WO | WO 2014/006928 A1 | 1/2014 |

OTHER PUBLICATIONS

International Preliminary Report on Patentability as issued in International Patent Application No. PCT/JP2014/054744, dated Sep. 1, 2015.

Notification of Reasons for Refusal as issued in Japanese Patent Application No. 2013-036392, dated Oct. 4, 2016.

* cited by examiner

OIL SEPARATOR

CROSS-REFERENCE TO RELATED APPLICATIONS

This application is the U.S. National Stage of PCT/JP2014/054744, filed Feb. 26, 2014, which in turn claims priority to Japanese Patent Application No. JP 2013-036392, filed Feb. 26, 2013. The contents of these applications are incorporated herein by reference in their entireties.

TECHNICAL FIELD

The present invention relates to an oil separator that separates oil contained in air that has passed through equipment.

BACKGROUND ART

Vehicles such as trucks, buses, and construction machines utilize compressed air sent from a compressor, which is directly connected to an internal combustion engine (hereinafter, referred to as an engine) to control systems such as brakes and suspensions. The compressed air contains water, which is contained in the atmosphere, and oil for lubricating the inside of the compressor. When the compressed air containing such water and oil enters inside the systems, it causes rust and swelling of rubber members (such as O-rings) and results in an operational defect. Thus, an air dryer is provided downstream of the compressor in a pneumatic system for removing water and oil from the compressed air (for example, Patent Document 1).

A filter and a desiccant such as silica gel and zeolite are provided in the air dryer. The air dryer performs dehumidification to remove water from compressed air and regeneration to regenerate the desiccant by removing the water adsorbed by the desiccant and discharging it to the outside.

PRIOR ART DOCUMENT

Patent Document

Patent Document 1: Japanese Laid-Open Patent Publication No. 10-296038

SUMMARY OF THE INVENTION

Problems that the Invention is to Solve

The air discharged from the air dryer during regeneration of the desiccant contains oil together with water. Considering the burden on the environment, an oil separator may be provided downstream of the compressor in the pneumatic system. This oil separator allows air that contains oil to strike an impingement member provided in the housing to separate the oil from the air and recovers the oil. The oil separator then discharges cleaned air.

Conventionally, the position of liquid surface in the hose connected to a drain outlet is visually checked to determine the amount of liquid stored in the oil separator. However, for such visual checking, the user needs to approach the oil separator. Thus, the amount of collected liquid cannot be determined during driving. The amount of collected liquid needs to be checked periodically. Thus, an oil separator that allows the amount of collected liquid to be checked easily has been desired.

Accordingly, it is an objective of the present invention to provide an oil separator that allows the amount of collected liquid to be checked easily.

Means for Solving the Problems

To achieve the foregoing objective and in accordance with one aspect of the present invention, an oil separator is provided that includes a housing and an impingement member located in the housing. The oil separator introduces purge air into the housing from an air dryer, causes the purge air to strike the impingement member to separate oil from the introduced purge air, thereby recovering collected liquid containing the oil, and discharges cleaned air. The oil separator further includes a detecting member provided in the housing. The detecting member is configured to detect an amount of the collected liquid in the housing. The detecting member is configured to output a result of the detection to a notifying member, which notifies a user of the amount of the collected liquid based on the result of the detection.

MODES FOR CARRYING OUT THE INVENTION

An oil separator according to one embodiment will now be described with reference to FIGS. 1 to 8.

Figure 1:
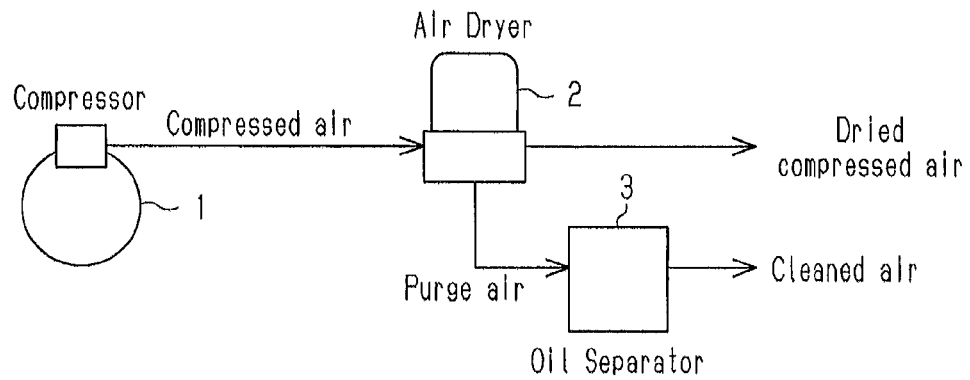
FIG. 1 is a block diagram illustrating an installation position of an oil separator in a pneumatic system.

As shown in FIG. 1, vehicles such as trucks, buses, and construction machines utilize compressed air delivered from a compressor 1 to control systems such as brakes and suspensions. Thus, an air dryer 2, which removes oil and water in the compressed air and supplies dried air, is located downstream of the compressor 1 of a pneumatic system. The air dryer 2 incorporates a desiccant. The air dryer 2 performs dehumidification to remove oil and water from the compressed air and regeneration to regenerate the desiccant by removing the oil and water adsorbed by the desiccant and discharging them to the outside.

In the present embodiment, since air (purge air) that is discharged from the air dryer 2 during regeneration of the desiccant contains oil together with water, an oil separator 3 is provided downstream of the compressor 1 of the pneumatic system, taking the burden on the environment into consideration. In particular, the oil separator 3 is provided in an exhaust system of the air dryer 2 to separate and recover oil and water from purge air discharged during regeneration of the desiccant in the air dryer 2.

The oil separator 3 is an impingement plate type and includes, inside the housing, impingement members, against which air containing oil and water strikes. The impingement plate-type oil separator 3 performs gas/liquid separation by allowing air containing oil and water to strike the impingement members. In this manner, the oil separator 3 recovers oil from air and discharges cleaned air. The liquid that has been separated from air contains oil and water. Such liquid will hereafter be referred to as collected liquid in some cases.

Figure 2:
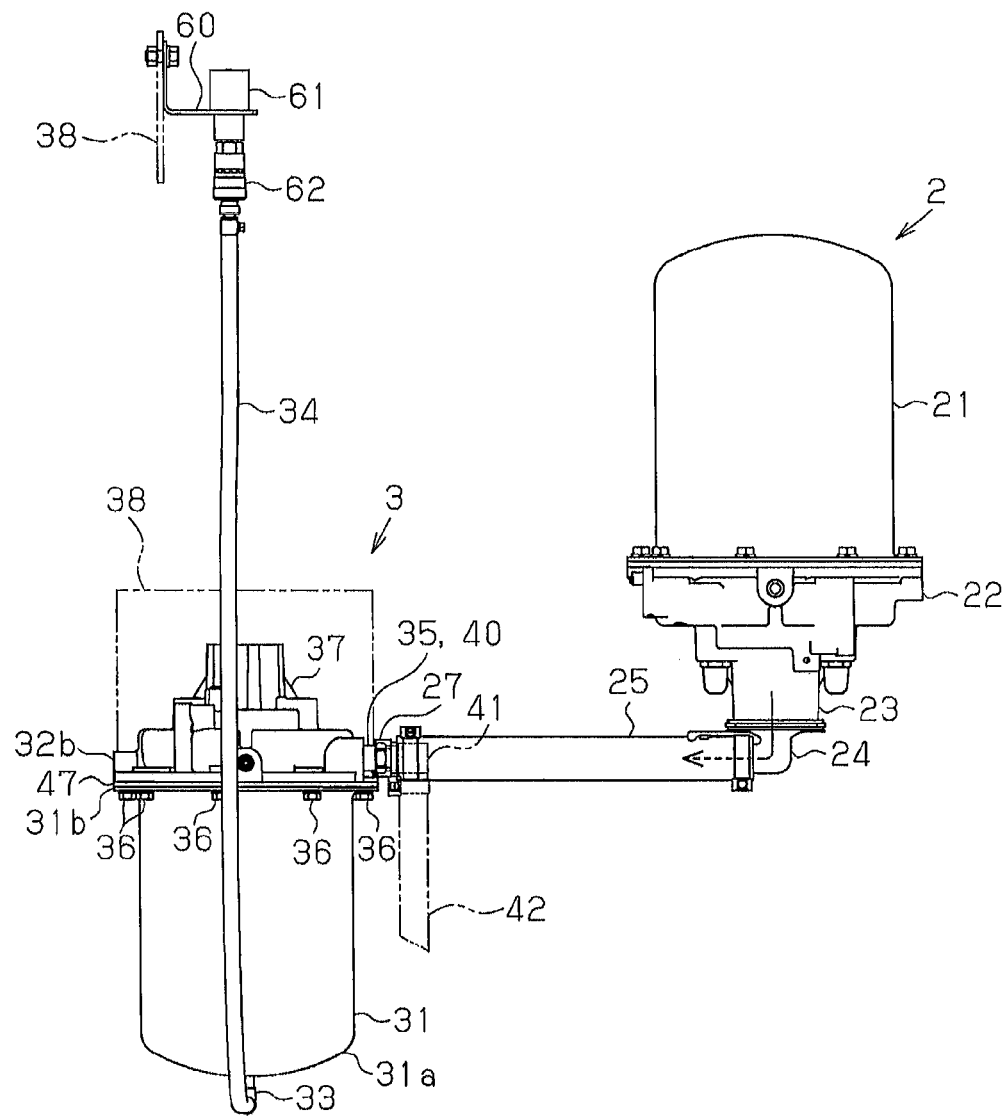
FIG. 2 is a diagram illustrating a mounting state of the oil separator of FIG. 1, which is connected to an air dryer.

As shown in FIG. 2, an air dryer 2 includes a cylindrical case 21 and a support member 22. The vertically upper end of the case 21 is closed. The support member 22 closes the opening portion of the case 21 and supports the case 21. A purge air outlet 23, which discharges purge air during regeneration of a desiccant, is formed at the lower section of the support member 22. A purge air discharge cover 24, to which a connecting hose 25 is connected, is attached to the purge air outlet 23. The connecting hose 25 is connected to an oil separator 3. The support member 22 of the air dryer 2 has an inlet (not shown) for introducing air compressed by the compressor 1 and an outlet (not shown) for discharging dried compressed air.

The oil separator 3 includes a cylindrical housing having a closed end and extending in the vertical direction, which is a case 31 in this embodiment, and a lid 32, which closes the opening portion of the case 31. A drain outlet 33 for draining the collected liquid that has been stored is provided at a bottom portion 31*a* of the case 31. A drain hose 34, which is used when removing the collected liquid, is connected to the drain outlet 33. The lid 32 has an inlet 35 for introducing purge air from the air dryer 2 through the connecting hose 25 and an outlet 40 for discharging cleaned air from which oil has been separated. The inlet 35 and the outlet 40 are formed separately. The inlet 35 and the connecting hose 25 are connected to each other by a coupling member 27.

A discharge hose 42 is connected to the outlet 40 of the oil separator 3 via a connecting member 41, which extends in the horizontal direction and bends vertically downward.

A mounting member 37 is formed integrally with the lid 32 of the oil separator 3. The mounting member 37 extends upright from the lid 32. The mounting member 37 is secured to a chassis 38 with bolts.

The distal end of the drain hose 34 is detachably attached to a support member 60, which is secured to, for example, the chassis 38 of the vehicle. That is, a securing member 61 is secured to the support member 60. A one-touch coupler 62 is secured to the lower end of the securing member 61. The one-touch coupler 62 allows the distal end of the drain hose 34 to be attached to the securing member 61 by a single operation. The distal end of the drain hose 34 is secured to the securing member 61 by being inserted into the one-touch coupler 62, and is detached from the securing member 61 by manipulating the one-touch coupler 62. The distal end of the drain hose 34 is attached to the securing member 61 to face vertically upward. The distal end of the drain hose 34 is located above the lid 32 of the oil separator 3. Thus, the collected liquid is prevented from leaking from the distal end of the drain hose 34.

Figure 3:
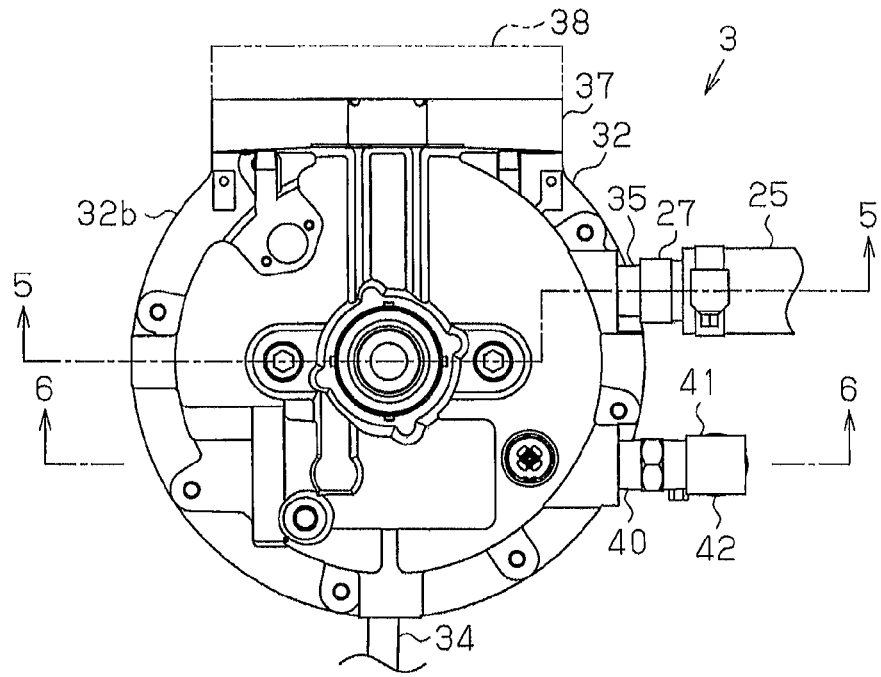
FIG. 3 is a top view illustrating the position of an inlet and an outlet of the oil separator of FIG. 2.
Figure 4:
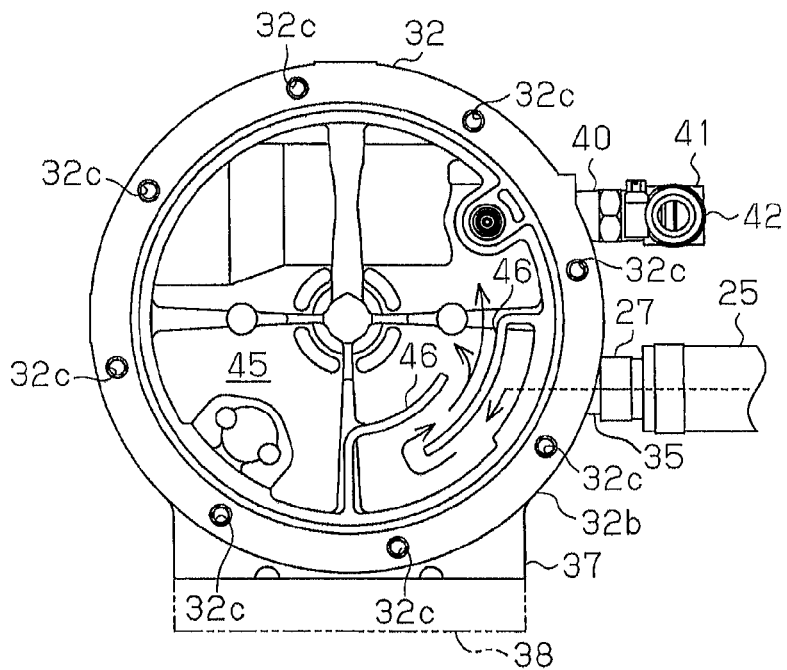
FIG. 4 is a bottom view illustrating the inside of the lid of the oil separator of FIG. 2.

As shown in FIGS. 3 and 4, the inlet 35 and the outlet 40 of the lid 32 are open in the same direction. The connecting hose 25 is connected to the inlet 35 via the coupling member 27. The connecting member 41 is connected to the outlet 40. That is, the coupling member 27 and the connecting member 41 are arranged side by side.

Figure 5:
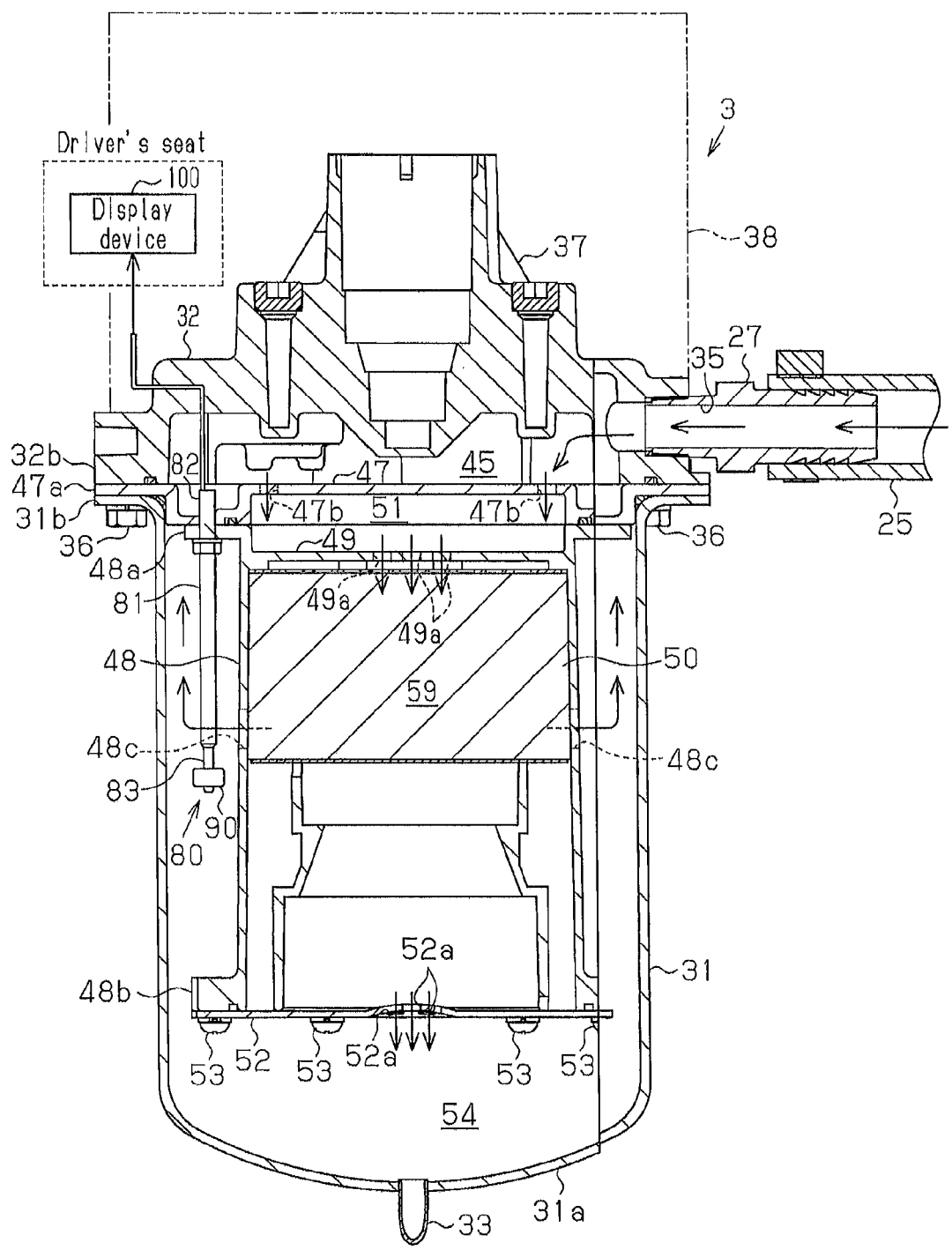
FIG. 5 is a cross-sectional view taken along line 5-5 in FIG. 3.

As shown in FIG. 5, the lid 32 is a cylinder having a vertically upper end closed. Two baffle plates 46 extend from the inner wall of the lid 32 in the vicinity of the inlet 35 to be perpendicular to the flow direction of the purge air introduced through the inlet 35. The internal space of the lid 32 functions as a first expansion chamber 45, which expands the purge air introduced from the inlet 35. The lid 32 has a communication section 32*a*, which connects the inside of the case 31 to the outlet 40.

Figure 6:
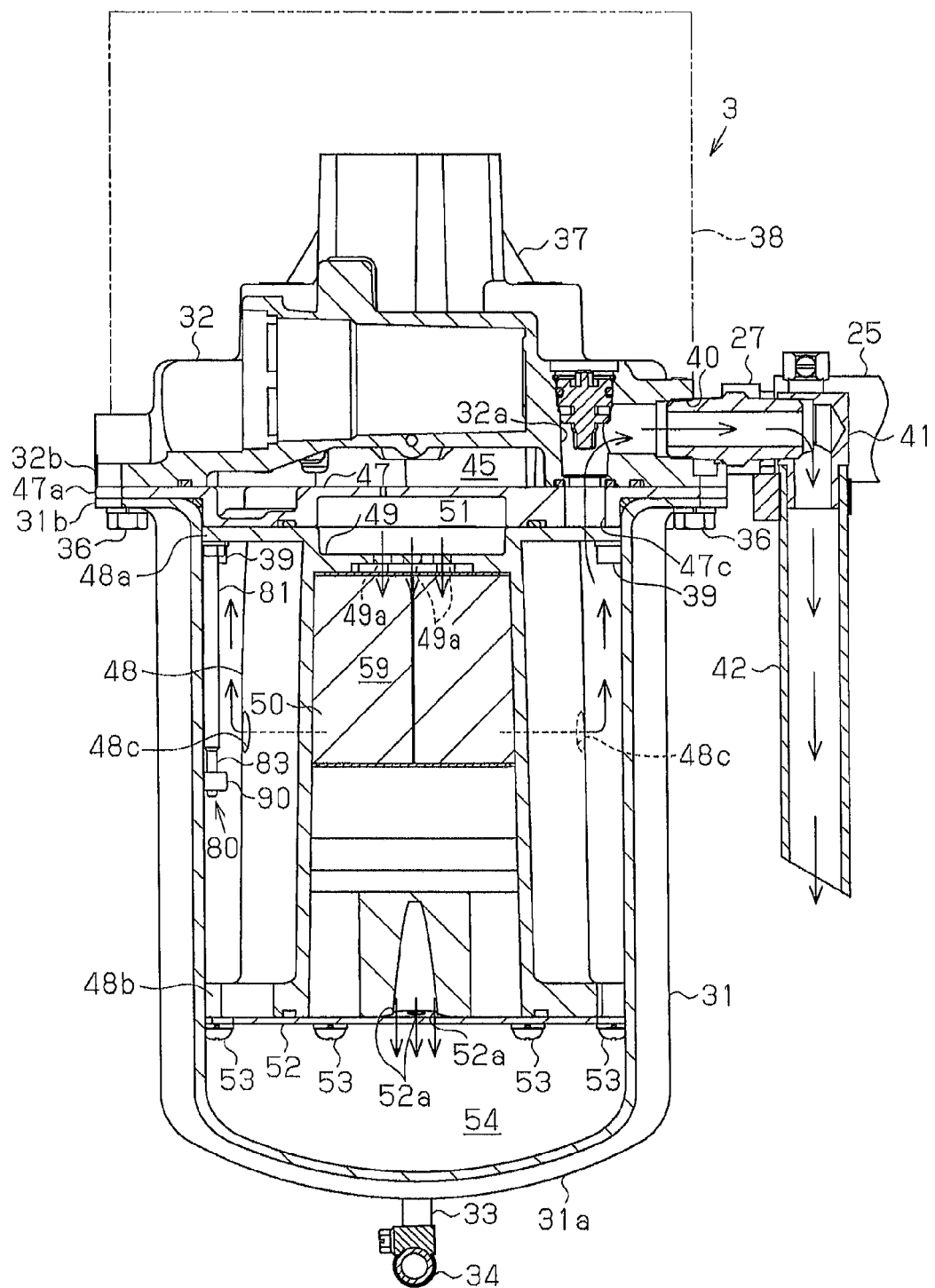
FIG. 6 is a cross-sectional view taken along line 6-6 in FIG. 3.

As shown in FIG. 6, a disk-like cover 47, which closes the case 31 and the opening portion of the lid 32, is provided between the case 31 and the lid 32. The cover 47 and the case 31 are fastened to the lid 32 with bolts 36. That is, the bolts 36 are fastened to threaded bores 32*c* formed in a flange portion 32*b* of the lid 32. Furthermore, threaded portions of the bolts 36 extend through through-holes formed in a flange portion 31*b* of the case 31. The cover 47 has through-holes through which the threaded portions of the bolts 36 extend. The threaded portions of the bolts 36 extend through the through-holes of the flange portion 31*b* of the case 31 and the through-holes of a flange portion 47*a* of the cover 47. The bolts 36 are then screwed to the threaded bores 32*c* of the flange portion 32*b* of the lid 32 so that the lid 32, the cover 47, and the case 31 are fastened together. The cover 47 has a communication hole 47*c*, which connects the inside of the case 31 to the outlet 40.

The space formed by the lid 32 and the cover 47 functions as the first expansion chamber 45. A cylindrical accommodation member 48 having a vertically upper end closed is secured to the cover 47 with bolts 39. The accommodation member 48 accommodates a urethane foam block 50 such as a sponge. The urethane foam block 50 functions as an impingement member. A flange portion 48*a* and a flange portion 48*b* are formed at an upper edge and a lower edge of the accommodation member 48, respectively. The bolts 39 extend through the flange portion 48*a* formed at the upper edge of the accommodation member 48 so that the accommodation member 48 is fastened to the cover 47. The space formed by the cover 47 and upper surface of the accommodation member 48 functions as a second expansion chamber 51. The cover 47 has through holes 47*b*, which connect the first expansion chamber 45 to the second expansion chamber 51. Through holes 49*a* are formed at the center portion of an upper base 49 of the accommodation member 48. The through holes 47*b* of the cover 47 and the through holes 49*a* of the upper base 49 of the accommodation member 48 are formed at positions that are not opposed to each another. The accommodation member 48 has through holes 48*c* formed at the lower end of the side face at intervals in the radial direction.

A disk-like support lid 52 is secured to the flange portion 48*b*, which is formed at the lower edge of the accommodation member 48, with screws 53. The support lid 52 supports the accommodated urethane foam block 50. The support lid 52 is formed to have a diameter that is substantially the same as the inner diameter of the case 31. The space formed by the upper base 49 of the accommodation member 48 and the support lid 52 functions as a third expansion chamber 59. The support lid 52 has through holes 52*a*, which permit the oil and water removed by the urethane foam block 50 to drop. Thus, the lower section in the case 31 functions as a collected liquid storage portion 54.

As shown in FIG. 5, the case 31 of the oil separator 3 incorporates a level gauge 80. The level gauge 80 serves as a detecting member that detects that collected liquid reaches a vicinity of the capacity limit. The level gauge 80 has a columnar main body 81. A proximal end portion 82 of the main body 81 is inserted into a through hole formed in the lid 32 and fixed with a bolt. The main body 81 has a distal end portion 83, which has a reduced diameter. An annular float 90 is fitted about the distal end portion 83. The float 90 is configured to float on the surface collected liquid.

Figure 7:
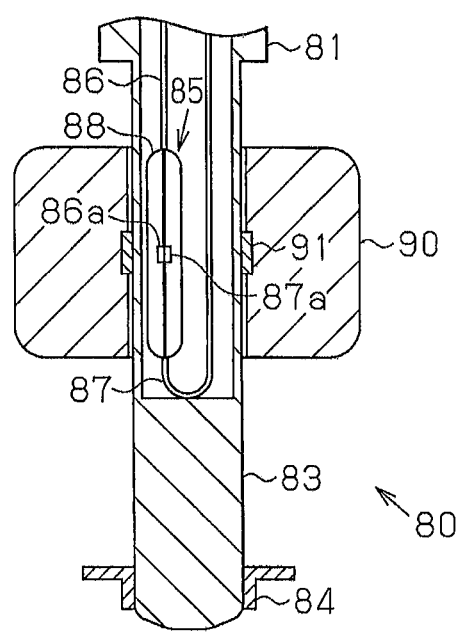
FIG. 7 is an enlarged cross-sectional view showing the structure of the level gauge of FIG. 5.
Figure 8:
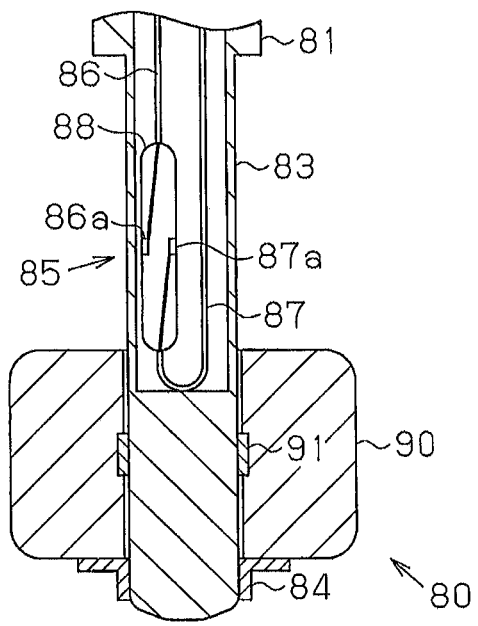
FIG. 8 is an enlarged cross-sectional view showing the structure of the level gauge of FIG. 5.

As shown in FIGS. 7 and 8, an annular magnet 91 is fitted in the inner circumference of the float 90. A flange 84 is attached to the distal end portion 83 to prevent the float 90 from falling off the main body 81. The flange 84 is fixed to the distal end portion 83 after the float 90 is attached to the distal end portion 83. The distal end of the main body 81 of the level gauge 80 is located below the vicinity of the capacity limit of the collected liquid stored in the collected liquid storage portion 54. Thus, the float 90 floats on the surface of the collected liquid at a level below the vicinity of the capacity limit. When the surface of the collected liquid rises, the float 90 also rises along the main body 81 to the vicinity of the capacity limit of the collected liquid.

A reed switch 85 is provided in the distal end portion 83 in the vicinity of the capacity limit of the collected liquid. The reed switch 85 has two reeds 86, 87, which are made of magnetic material. The distal ends of the reeds 86, 87 are free ends, which are sealed in a glass tube while facing each other with a contact separation in between. Nitrogen gas is sealed in the glass tube 88 to prevent the contacts from being activated.

When a magnetic field is applied in the axial direction of the reeds 86, 87, the reeds 86, 87 are magnetized. This causes contacts 86a, 87a, which are facing free ends, to be attracted to and contact each other. Accordingly, the reed switch 85 closes the circuit. In contrast, when the applied magnetic field is ceased, the elasticity of the reeds 86, 87 separates the contacts 86a, 87a from each other. Accordingly, the reed switch 85 opens the circuit.

When the float 90, to which the magnet 91 is attached, is located in the vicinity of the capacity limit of the collected liquid, the reed switch 85 closes the circuit and conducts. This causes the level gauge 80 to output a detection signal to a display device 100, which is a notifying member. The display device 100 is arranged in front of the driver's seat of the vehicle. The display device 100 has a lamp that is lit when the reed switch 85 conducts.

Operation of the oil separator 3 configured as described above will now be described.

As shown in FIG. 2, purge air discharged from the air dryer 2 is introduced to the oil separator 3. The purge air contains oil and water.

As shown in FIG. 5, the purge air introduced through the inlet 35 strikes the baffle plates 46, is introduced into the oil separator 3 along the baffle plates 46, and expands in the first expansion chamber 45.

As shown in FIG. 6, the air that has expanded in the first expansion chamber 45 enters the second expansion chamber 51 via the through holes 47b formed in the cover 47. The air that has expanded in the second expansion chamber 51 enters the third expansion chamber 59 via the through holes 49a of the upper base 49, so that oil and water strike the urethane foam block 50 and are separated from the air. The liquid containing the water and the oil trapped by the urethane foam block 50 reaches the support lid 52 through the inside of the urethane foam block 50 and then drops through the through hole 52a of the support lid 52 into the collected liquid storage portion 54, and is stored in the collected liquid storage portion 54. The liquid that has stored in the collected liquid storage portion 54 enters the drain hose 34 from the drain outlet 33.

When the surface of the liquid in the collected liquid storage portion 54 is below the distal end of the level gauge 80, the float 90 is located on the upper surface of the flange 84 as shown in FIG. 8. Thus, no magnetic field is applied to the contacts 86a, 87a, so that the contacts 86a, 87a are separated and the reed switch 85 opens the circuit. In this state, the lamp of the display device 100 is not lit.

When the surface of the liquid in the collected liquid storage portion 54 reaches the distal end portion 83 of the level gauge 80, the float 90 is lifted as shown in FIG. 7. When the surface of the collected liquid reaches the vicinity of the capacity limit, the float 90 approaches the reed switch 85, so that the magnetic force of the magnet 91 causes the contacts 86a, 87a to contact each other. The reed switch 85 thus closes the circuit. This lights the lamp of the display device 100.

The amount of the collected liquid stored in the collected liquid storage portion 54 can be determined by checking the amount of the collected liquid stored in the drain hose 34. When the amount of the collected liquid approaches the upper limit, the collected liquid is drained from the collected liquid storage portion 54 through the drain hose 34.

As shown in FIG. 6, oil and water are separated from the air that has entered the accommodation member 48 from the through holes 49a of the upper base 49. The air then enters the case 31 from the through holes 48c on the side face of the accommodation member 48. The air that has entered the case 31 passes through the communication hole 47c of the cover 47 and the communication section 32a of the lid 32, and is discharged through the outlet 40. Thus, the air that has entered the case 31 hardly contacts the collected liquid in the collected liquid storage portion 54 and is discharged from the outlet 40. The air that is discharged from the outlet 40 is cleaned air that does not contain oil.

The above-described embodiment achieves the following advantages.

(1) The level gauge 80, which is arranged in the case 31, detects the amount of collected liquid and outputs the detected amount to the display device 100. This allows the driver to know the amount of the collected liquid. The driver therefore does not need to get out of the vehicle to visually check the amount of the collected liquid. Thus, the driver in the vehicle can easily check the amount of the collected liquid.

(2) The level gauge 80 detects that the collected liquid has reached the vicinity of the capacity limit. That is, the amount of collected liquid is not detected in the whole range, but only the necessary range is detected. Specifically, only the vicinity of the maximum volume is detected. This simplifies the structure of the level gauge 80.

(3) The display device 100, which is arranged in front of the driver's seat of the vehicle, shows detection information of the level gauge 80. This allows the driver to easily check the amount of collected liquid without leaving the driver's seat.

(4) Since the level gauge 80 detects the amount of collected liquid according to the position of the float 90, the amount of collected liquid is easily detected by the surface of the collected liquid.

(5) Since the level gauge 80 detects the position of the float 90 by using the magnetic force of the magnet 91, the position of the float 90 can be detected in a contactless manner. The level gauge 80 thus has a simpler structure than a mechanical configuration.

The above described embodiment may be modified as follows.

In the above illustrated embodiment, the magnet 91 is located at the inner circumference of the float 90. However, a magnet may be incorporated in the float 90. Alternatively, the magnet 91 may be located on the outer circumference of the float 90.

In the above illustrated embodiment, the level gauge 80 only detects the vicinity of the capacity limit of collected liquid. However, the distal end portion 83 of the main body 81 of the level gauge 80 may be extended, and two or more reed switches 85 may be provided in the distal end portion 83, so that the amount of collected liquid is detected at multiple positions.

In the above illustrated embodiment, the position of the float 90 is detected by the reed switch 85. However, any other type of magnetic sensor may be used.

In the illustrated embodiment, the position of the float 90 is detected by means of magnetism. Not limited to this, the position of the float 90 may be detected by means of a mechanical switch.

In the above illustrated embodiment, the display device 100 is located in front of the driver's seat of the vehicle. However, the display device 100 may be provided in the vicinity of the case 31, which is a housing.

In the illustrated embodiment, a lamp is used as the display device 100, which is a notifying member. However, the notifying member may be configured to display letters or characters or to make a sound.

To limit the height of the air dryer 2 and the oil separator 3 in the vertical direction, the inlet 35 of the oil separator 3 may be located above the connection port of the purge air discharge cover 24 in the vertical direction. Alternatively, the inlet 35 of the oil separator 3 may be located below the connection port of the purge air discharge cover 24 in the vertical direction.

In the above illustrated embodiment, the distal end of the drain hose 34 is located above the lid 32 of the oil separator 3. However, as long as collected liquid is prevented from leaking from the distal end of the drain hose 34, the distal end of the drain hose 34 may be located below the lid 32 of the oil separator 3.

In the above illustrated embodiment, the drain hose 34 is connected to the drain outlet 33 of the case 31. However, the drain hose 34 may be omitted, and a plug may be provided on the drain outlet 33 so that the collected liquid can be directly discharged from the drain outlet 33.

In the above illustrated embodiment, the first expansion chamber 45, the second expansion chamber 51, and the third expansion chamber 59 are provided in the oil separator 3. However, at least one of the first expansion chamber 45, the second expansion chamber 51, and the third expansion chamber 59 may be employed. Alternatively, four or more expansion chambers may be provided.

In the above illustrated embodiment, a member such as a nonwoven fabric filter may be provided upstream or downstream of the urethane foam block 50 or in the expansion chambers 45, 51. In this case, the removal rate of the oil component is increased. Furthermore, a member such as a nonwoven fabric filter may be charged with static electricity. In this case, the removal rate of the oil component is further increased.

In above illustrated embodiment, the urethane foam block 50 is employed as the impingement member, but other members such as a crushed aluminum member may be employed.

The invention claimed is:

1. A system comprising:
    an air dryer comprising a supply line configured and arranged to supply compressed air and an exhaust line configured and arranged to discharge purge air; and
    an oil separator connected to the exhaust line of the air dryer,
    wherein the oil separator comprises a housing and an impingement member located in the housing, wherein the oil separator is configured to introduce purge air into the housing from the air dryer, cause the purge air to strike the impingement member to separate oil from the introduced purge air, thereby recovering collected liquid containing the oil, and discharge cleaned air,
    wherein the oil separator further comprises a detector provided in the housing, and
    wherein the detector is configured to
        detect an amount of the collected liquid in the housing, and
        output a result of the detection to a notifying member, which notifies a user of the amount of the collected liquid based on the result of the detection.

2. The system according to claim 1, wherein the detector is configured to detect that the amount of the collected liquid has reached a vicinity of a capacity limit.

3. The system according to claim 1, wherein the notifying member is a display device, which is located in front of a driver's seat of a vehicle.

4. The system according to claim 1, wherein,
    the detector includes a float, which is configured to float on a surface of the collected liquid, and
    the detector is configured to detect the amount of the collected liquid by detecting the position of the float.

5. The system according to claim 4, wherein the detector is configured to detect the amount of the collected liquid by detecting a magnetic force of a magnet provided in the float.

6. The system according to claim 1, wherein the oil separator is provided downstream of the air dryer.

7. The system according to claim 1, further comprising a compressor.

8. The system according to claim 7, wherein the compressor is provided upstream of the oil separator.

9. The system according to claim 7, wherein the air dryer has an inlet configured to introduce air compressed by the compressor and an outlet configured to discharge dried compressed air as the purge air.

* * * * *